United States Patent
Jing et al.

(10) Patent No.: US 8,600,554 B2
(45) Date of Patent: Dec. 3, 2013

(54) SYSTEM AND METHOD FOR ROBOT TRAJECTORY GENERATION WITH CONTINUOUS ACCELERATIONS

(75) Inventors: Fengshui Jing, Beijing (CN); Min Tan, Beijing (CN); En Li, Beijing (CN); Zize Liang, Beijing (CN); Zengguang Hou, Beijing (CN); Degang Yang, Beijing (CN); Kailiang Zhang, Beijing (CN); Yanhui Qiang, Beijing (CN)

(73) Assignee: Institute of Automation, Chinese Academy of Sciences, Beijing (CN)

( * ) Notice: Subject to any disclaimer, the term of this patent is extended or adjusted under 35 U.S.C. 154(b) by 183 days.

(21) Appl. No.: 13/142,540

(22) PCT Filed: Jun. 4, 2010

(86) PCT No.: PCT/CN2010/000797
§ 371 (c)(1),
(2), (4) Date: Jun. 28, 2011

(87) PCT Pub. No.: WO2011/150534
PCT Pub. Date: Dec. 8, 2011

(65) Prior Publication Data
US 2012/0029699 A1 Feb. 2, 2012

(51) Int. Cl.
*G05B 19/00* (2006.01)
*G06F 19/00* (2011.01)

(52) U.S. Cl.
USPC .......................................... 700/263; 700/245

(58) Field of Classification Search
USPC .......................................................... 700/263
See application file for complete search history.

(56) References Cited

U.S. PATENT DOCUMENTS

| 4,663,726 A | 5/1987 | Chand et al. ................... 364/513 |
| 5,434,489 A | 7/1995 | Cheng et al. ............. 318/568.15 |
| 2007/0255454 A1* | 11/2007 | Dariush ....................... 700/245 |

FOREIGN PATENT DOCUMENTS

| CN | 101332604 A | 12/2008 |
| CN | 101612734 A | 12/2009 |
| JP | 2004-322224 A | 11/2004 |

* cited by examiner

*Primary Examiner* — Khoi Tran
*Assistant Examiner* — Robert Nguyen
(74) *Attorney, Agent, or Firm* — Seed IP Law Group PLLC

(57) ABSTRACT

A method for robot trajectory generation with continuous acceleration, Receiving a user's motion command through a motion command interface, and sending the user's motion command to Cartesian trajectory generator; Converting the user's command to a trajectory path points of robot end effector in Cartesian space; Transforming the trajectory path points of robot end effector in Cartesian space into a robot trajectory path points in a joint space; Calculating positions, velocities and accelerations of robot joints in each motion servo cycle; Comparing the positions, velocities and accelerations of the robot joints generated by a joint Trajectory Interpolator with a velocity's limit value and an acceleration's limit value of each robot joint stored in a robot parameter database respectively.

22 Claims, 4 Drawing Sheets

SYSTEM AND METHOD FOR ROBOT TRAJECTORY GENERATION WITH CONTINUOUS ACCELERATIONS

FIELD OF THE INVENTION

The present invention relates to robot, especially to a system and method for generating robotic manipulator trajectories.

BACKGROUND OF THE INVENTION

Industrial robot accomplishes tasks through the movement of its end effector in Cartesian space, which cannot be controlled directly. It has to be realized by controlling the robot joints' motion. The position, velocity and acceleration of each joint determine the pose, velocity and acceleration as well as the trajectory of end effector at any time. Therefore, in order to perform Cartesian control of end-effector's pose, velocity and acceleration at each moment, the position, velocity and acceleration of each joint in every servo period have to be controlled, which is the purpose of trajectory generation.

The trajectory of robot end effector defines a set of discrete path points consisted of pose, velocity and acceleration at certain intervals in Cartesian space. As described above, all the path points of end effector in Cartesian space must be transformed into the corresponding path points of robot joints in Joint space. The transformation of pose and velocity of path points can be achieved by inverse kinematics and inverse Jacobian matrix, respectively. However it is unable to calculate the inverse Jacobian matrix sometimes when any two joint axes of a 6-dof (degree of freedom) robot come to one line. Those special configurations are called singular configurations. At singular configurations, robot's Jacobian matrix is singular, so joint velocity cannot be calculated out from Cartesian velocity by inverse Jacobian matrix. Moreover the joint acceleration calculation methods based on inverse Jacobian matrix also failed at singular configurations. That is to say, the velocity and acceleration in Joint space cannot be always worked out through the equivalence in Cartesian space directly.

The time intervals of discrete path points on motion trajectory in Joint space are often greatly larger than the servo period of joint driver (the typical motion servo period is 5 milliseconds). So the trajectory planning in Joint space should be performed by interpolating arrays of the transformed path points, forming a smooth trajectory in Joint space to satisfy the real time demand of the motor servo system. Different interpolation methods can be chosen, for example, trapezoidal speed curve interpolation method and various type spline curve interpolation methods. The PMAC (Programming Multi-Axis Controller) produced by American Delta Tau company provides two cubic-spline interpolation methods such as SPLINE1 and PVT.

Spline 1 method simply needs to know the displacement and time at all path points (the velocity at the start point and the end point are equal to zero), which does not need to settle problems of joint's velocity. However the control accuracy of the velocity on trajectory is worse. On the other hand, PVT method needs to know the position and velocity at all path points, the control accuracy of which is higher than Spline1 method, but it cannot deal with the situation when robot is at singular configurations. The US patent "Robot control utilizing cubic spline interpolation" (U.S. Pat. No. 4,663,726) puts forward to a look-ahead way to control robot utilizing cubic spline interpolation, which can deal with both the situations when path points have velocity or not.

However these curve interpolation methods mentioned above have not taken into account the acceleration of all path points. As for robot motion control, jerky motions and system vibrations tend to be caused by discontinuity and uncontrolled acceleration.

SUMMARY OF THE INVENTION

The subject of the present invention is to provide a system and method for robot trajectory generation with continuous accelerations.

According to an aspect of the present invention, a method for robot trajectory generation with continuous accelerations comprises the steps of:

Receiving user's motion command through motion command interface, and sending user's motion command to Cartesian Trajectory Generator;

Converting user's command to trajectory path points data of robot end effector in Cartesian space;

Transforming trajectory path points data of robot end effector in Cartesian space to robot trajectory path points data in Joint space;

Calculating position, velocity and acceleration of robot joints in each motion servo cycle;

Comparing position, velocity and acceleration of robot joint generated by Joint Trajectory Interpolator with velocity's limit value and acceleration's limit value of each robot joint stored in Robot Parameter Database respectively.

The invention has wide applications which can be used in on-line trajectory planning as well as off-line mode; and it can be utilized in the situation without known velocities when robot is at singular configurations (taking the place of SPLINE 1 method) as well as the situation with known velocities of all path points (replacing PVT method). In this invention, the accelerations at all path points on trajectory are continuous and controllable, jerky motions and system vibrations caused by discontinuity and uncontrolled acceleration can be settled effectively.

DETAILED DESCRIPTION OF THE PREFERRED EMBODIMENTS

The present invention is method and system for robot trajectory generation with continuous accelerations. In the following description, numerous specific details are set forth to provide a more through description of the present invention. It will be apparent, however, to skilled in the art, that the present invention may be practiced without these specific details. In other instances, well known features have not been described in detail so as not to obscure the present invention.

Figure 1:
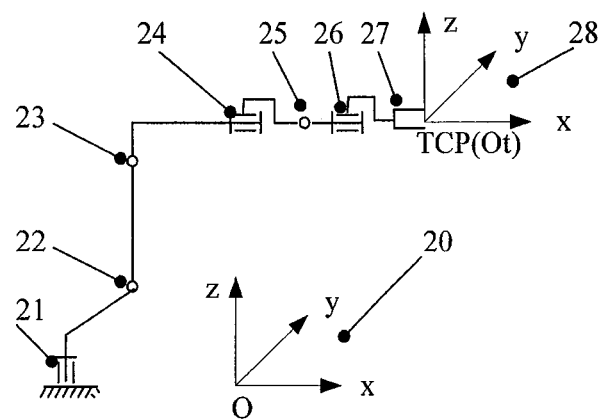
FIG. 1 is an illustration of multi joint industrial robot.

FIG. 1 is the illustration of multi-joint industrial robot. A robot has multi-joints, in which each joint is a kinematic pair, which includes a fixed part and a moving part. The moving part can move in one dimension driven by actuator (not shown in FIG. 1) relative to the fixed part. $q$, $\dot{q}$ and $\ddot{q}$ are used to represent the position, velocity and acceleration of robot joint, respectively. The fixed part of joint 21 is fixed on robot base; while robot base is fixed to earth, whose coordinate system is O-xyz. The moving part of joint 21 is connected to the fixed part of joint 22 through component; the moving part of joint 22 is connected to the fixed part of joint 23 through component; the moving part of joint 23 is connected to the fixed part of joint 24 through component; the moving part of joint 24 is connected to the fixed part of joint 25 through link; the moving part of joint 25 is connected to the fixed part of joint 26 through component; the moving part of joint 26 is connected to the fixed part of joint 27 through component.

Coordinate system Ot-xyz 28 (tool frame) is attached to end effector 27, and the origin of Ot-xyz 28 is coincident with TCP (end tool center point). Tool frame 28 moves along with end effector 27, which can be used to describe the pose, velocity and acceleration of end effector in earth coordinates O-xyz 20 (Cartesian space coordinates). Besides all coordinate systems described above, there is an accompany coordinate system (not shown in FIG. 1). Accompany coordinate system is coincident with tool frame at all times, while keeps the accompany coordinate system relative to earth coordinates in stillness. Moreover, accompany coordinate system is used to describe velocity and acceleration conveniently.

A homogeneous pose matrix is used to describe the pose of robot end effector:

$$\begin{bmatrix} ux & vx & wx & lx \\ uy & vy & wy & ly \\ uz & vz & wz & lz \\ 0 & 0 & 0 & 1 \end{bmatrix}.$$

where the vector $(lx,ly,lz)^T$ represents the origin of the tool frame 28, which is the TCP of end effector (position coordinate in earth coordinates O-xyz 20); $(ux,uy,uz)^T$, $(vx,vy,vz)^T$ and $(wx,wy,wz)^T$ represent the unit vector at x, y, z-axis of the tool frame 28 being projected to earth coordinates O-xyz 20, respectively.

The six-dimensional vector below is used to describe the velocity of robot end effector:

$$[\omega x, \omega y, \omega z, vx, vy, vz]^T$$

where $[\omega x, \omega y, \omega z]^T$ and $[vx, vy, vz]^T$ represent angular velocity and linear velocity of robot end effector 27 at x, y, z-axis in accompany coordinate system of tool frame 28, respectively.

The six-dimensional vector below is used to describe the acceleration of robot end effector:

$$[\xi x, \xi y, \xi z, ax, ay, az]^T$$

where $[\xi x, \xi y, \xi z]^T$ and $[ax, ay, az]^T$ represent angular acceleration and linear acceleration of robot end effector 27 at x, y, z-axis in accompany coordinate system of tool frame 28, respectively.

Figure 2:
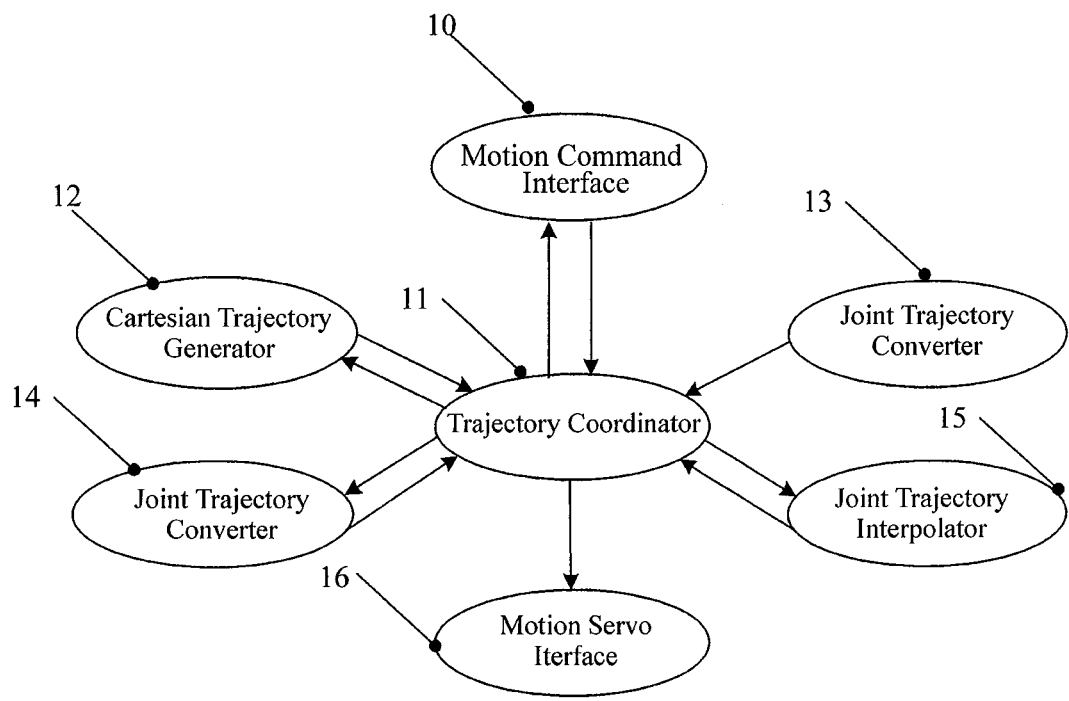
FIG. 2 is a structure chart of robot trajectory generation system.

FIG. 2 is the structure chart of robot trajectory generation system. Robot trajectory generation system includes Motion Command Interface 10, Trajectory Coordinator 11, Cartesian Trajectory Generator 12, Joint Trajectory Converter 14, Joint Trajectory Interpolator 15, Motion Servo Interface 16 and Robot Parameter Database 13, where the Motion Command Interface 10, Cartesian Trajectory Generator 12, Joint Trajectory Converter 14, Joint Trajectory Interpolator 15, Motion Servo Interface 16 and Robot Parameter Database 13 are connected together by Trajectory Coordinator 11 to form an integrate unit.

Trajectory Coordinator 11 receives user's motion command through Motion Command Interface 10. The most common motion command includes: linear motion or circular motion on condition that robot end effector keeps a certain pose and velocity; and the requirements of acceleration at the beginning of motion and deceleration at the end of motion, respectively. Trajectory Coordinator 11 sends user's motion command to Cartesian Trajectory Generator 12 to form trajectory path points data in Cartesian space, which include:

Pose $$\begin{bmatrix} ux & vx & wx & lx \\ uy & vy & wy & ly \\ uz & vz & wz & lz \\ 0 & 0 & 0 & 1 \end{bmatrix}_i,$$

velocity $$[\omega x, \omega y, \omega z, vx, vy, vz]^T_i$$

and acceleration $$[\xi x, \xi y, \xi z, ax, ay, az]^T_i,$$

where i=1, 2, 3, ... n represents the path point's index on a trajectory, and n is the number of path points on a trajectory.

Trajectory Coordinator 11 sends the Cartesian trajectory path points to Joint Trajectory Converter 14 to form trajectory path points in Joint space, which include Pose $$[q_1, q_2, \ldots q_j \ldots q_N]_i,$$

velocity $$[\dot{q}_1, \dot{q}_2, \ldots \dot{q}_j \ldots \dot{q}_N]_i$$

and acceleration $$[\ddot{q}_1, \ddot{q}_2, \ldots \ddot{q}_j \ldots \ddot{q}_N]_i,$$

where $q_j$, $\dot{q}_j$ and $\ddot{q}_j$ represent the position, velocity and acceleration at joint j (j is the index of joint, and j=1, 2, 3, ... N) respectively. The joint index J of robot base is 1, and index is increasing according to sequence. N is the number of robot joints.

The position of joint path point can be calculated by inverse kinematics. When robot is at singular configurations, the velocities or accelerations of robot joints are set as:

$$[\text{INVALIDVALUE}, \ldots, \text{INVALIDVALUE}]_i$$

where INVALIDVALUE represents an invalid number, which can take value of a large enough number beyond the reasonable motion range, such as 100000000 or −100000000.

The velocity of joint path point can be calculated by the following formula when robot is at non-singular configurations:

$$\begin{bmatrix} \dot{q}_1 \\ \dot{q}_2 \\ \ldots \\ \dot{q}_j \\ \ldots \\ \dot{q}_N \end{bmatrix}_i = J_i^{-1} \begin{bmatrix} \omega x \\ \omega y \\ \omega z \\ vx \\ vy \\ vz \end{bmatrix}_i,$$

where $J_i^{-1}$ represents the inverse Jacobian matrix at the $i_{th}$ path point on robot trajectory. The joint acceleration $[\ddot{q}_1, \ddot{q}_2, \ldots \ddot{q}_j \ldots \ddot{q}_N]_i$ at non-singular configurations can be calculated by the following recurrence formula:

$$\left( \begin{bmatrix} \xi x \\ \xi y \\ \xi z \\ ax \\ ay \\ az \end{bmatrix}_j \right)_i = \left( \begin{bmatrix} \xi x \\ \xi y \\ \xi z \\ ax \\ ay \\ az \end{bmatrix}_{j-1} + S_j \cdot \ddot{q}_j + \dot{S}_j \cdot \dot{q}_j \right)_i$$

where $S_j$ and $\dot{S}_j$ represent the joint axis vector and its derivative at the $j^{th}$ joint, respectively.

Furthermore, in order to implement trajectory interpolation calculation in Joint space, time interval $T_i$ is calculated by Joint Trajectory Interpolator 15, which stands for the time between the $i^{th}$ path point and the $(i+1)^{th}$ path point. $T_i$ is equal to zero when the $i^{th}$ path point is the terminal one; otherwise, $T_i$ can be calculated by the following formula:

$$T_i = 2\sqrt{\frac{(lx_{i+1}-lx_i)^2 + (ly_{i+1}-ly_i)^2 + (lz_{i+1}-lz_i)^2}{(vx_i+vx_{i+1})^2 + (vy_i+vy_{i+1})^2 + (vz_i+vz_{i+1})^2}}$$

Finally all robot trajectory path points in Joint space can be described as follows:

$$\begin{pmatrix} q_1 & \dot{q}_1 & \ddot{q}_1 & T_i \\ q_2 & \dot{q}_2 & \ddot{q}_2 & T_i \\ \ldots & \ldots & \ldots & \ldots \\ q_j & \dot{q}_j & \ddot{q}_j & T_i \\ \ldots & \ldots & \ldots & \ldots \\ q_N & \dot{q}_N & \ddot{q}_N & T_i \end{pmatrix}_i$$

Noting that time intervals of all the N joint trajectory path points in Cartesian space are the same, that is $T_i$.

Trajectory Coordinator 11 sends robot trajectory path points in Joint space to Joint Trajectory Interpolator 15, then joint motion command (position, velocity and acceleration) in each servo period as well as the maximum velocity and the minimum velocity in joint motion trajectory can be generated; Trajectory Coordinator 11 invokes velocity's limit value and acceleration's limit value of each robot joint stored in Robot Parameter Database 13, and compares all values with the maximum velocity and the minimum velocity generated by Joint Trajectory Interpolator 15. If all values are in the range between the maximum velocity and the minimum velocity, the joint motion command in each servo period generated by Joint Trajectory Interpolator 15 will be sent to Motion Servo Interface 16, otherwise, error message will be sent to Motion Command Interface 10.

Figure 3:
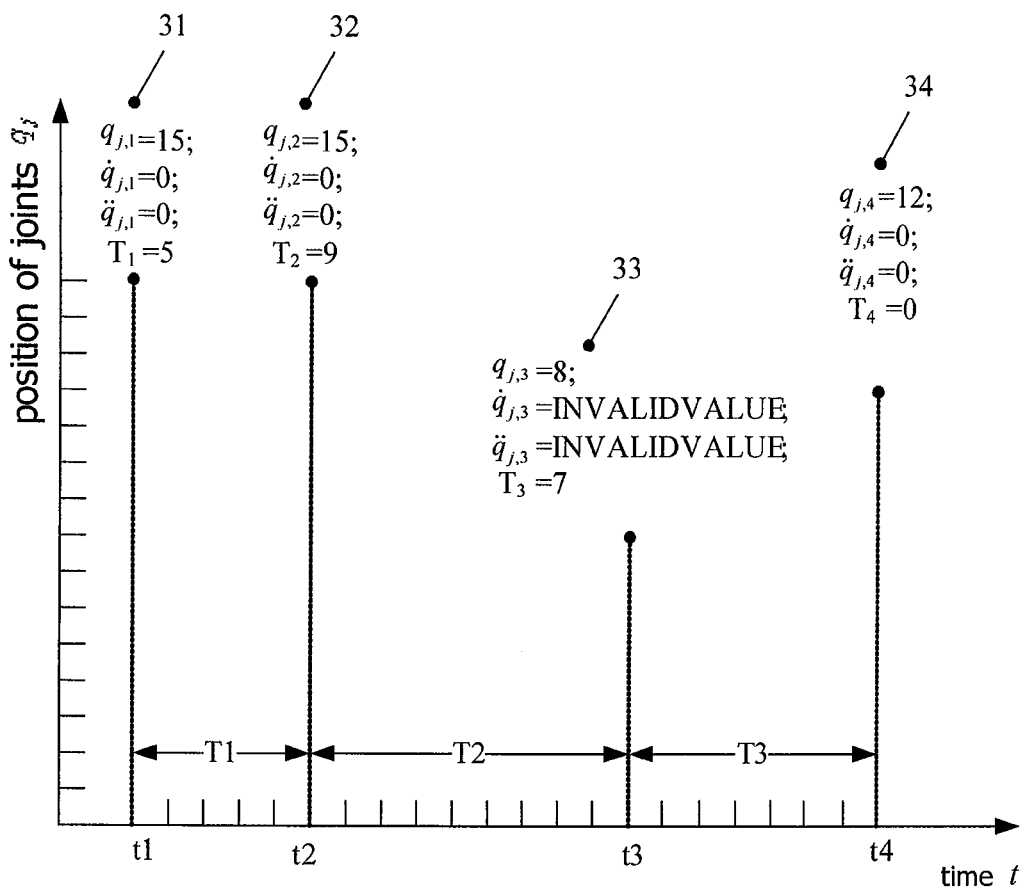
FIG. 3 is an illustration of path points on the trajectory of robot joint motion.

FIG. 3 is the illustration of path points on the motion trajectory of one robot joint. In FIG. 3, there are four joint path points: path point 31, path point 32, path point 33 and path point 34.

Path point 31 is the start point, whose position $q_{j,1}$ is equal to 15. The position unit can be determined according to actual requirement, such as coder's count value 'counts'. The velocity $\dot{q}_{j,1}$ is equal to 0. The velocity unit can be determined according to actual requirement, such as 'counts/s'. The acceleration $\ddot{q}_{j,1}$ is equal to 0. The acceleration unit can be determined according to actual requirement, such as 'counts/s$^2$'. The time interval between path point 31 and path point 32 is equal to 5. The time unit can be determined according to actual requirement, such as 's'.

Path point 32 is an intermediary point, whose position $q_{j,2}$ is equal to 15. The position unit can be determined according to actual requirement, such as coder's count value 'counts'. The velocity $\dot{q}_{j,2}$ is equal to 0. The velocity unit can be determined according to actual requirement, such as 'counts/s'. The acceleration $\ddot{q}_{j,1}$ is equal to 0. The acceleration unit can be determined according to actual requirement, such as 'counts/s$^2$'. The time interval between path point 32 and path point 33 is equal to 9. The time unit can be determined according to actual requirement, such as 's'.

Path point 33 is an intermediary point, whose position $q_{j,3}$ is equal to 8. The position unit can be determined according to actual requirement, such as coder's count value 'counts'. The velocity $\dot{q}_{j,3}$ is an invalid number 'INVALIDVALUE', which can be described by a large enough number beyond the reasonable motion range, such as 100000000 or −100000000. The acceleration $\ddot{q}_{j,3}$ is an invalid number 'INVALIDVALUE', which can be described by a large enough number beyond the reasonable motion range, such as 100000000 or −100000000. The time interval between path point 33 and path point 34 is equal to 7. The time unit can be determined according to actual requirement, such as 's'.

Path point 34 is the end point, whose position $q_{j,4}$ is equal to 12. The position unit can be determined according to actual requirement, such as coder's count value 'counts'. The velocity $\dot{q}_{j,4}$ is equal to 0. The velocity unit can be determined according to actual requirement, such as 'counts/s'. The acceleration $\ddot{q}_{j,4}$ is equal to 0. The acceleration unit can be determined according to actual requirement, such as 'counts/s$^2$'. The time interval between path point 34 and the next path point is equal to 0, which represents the current path point is a terminal one.

Figure 4:
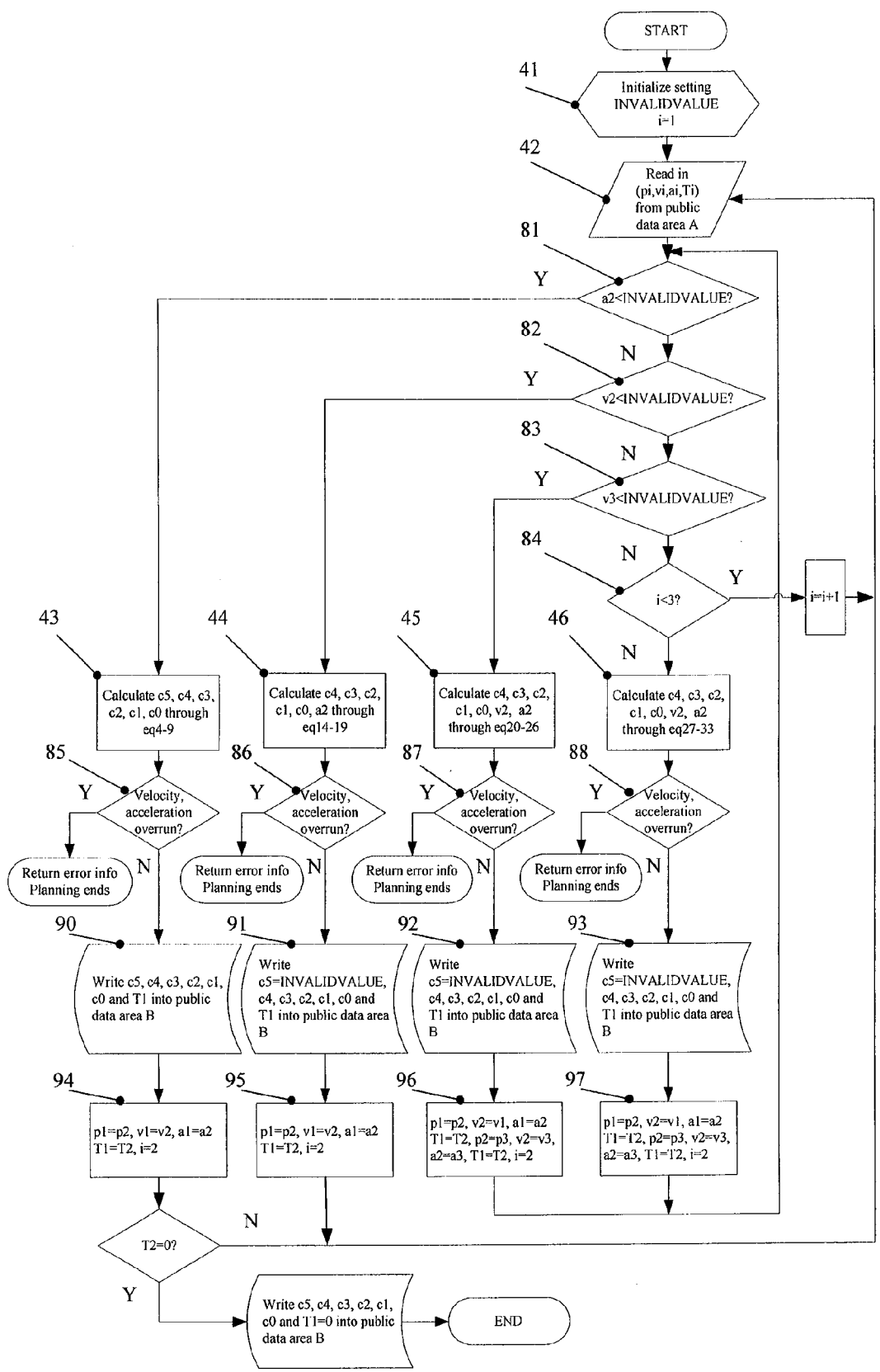
FIG. 4 is a flow chart of joint trajectory interpolation function.
Figure 5:
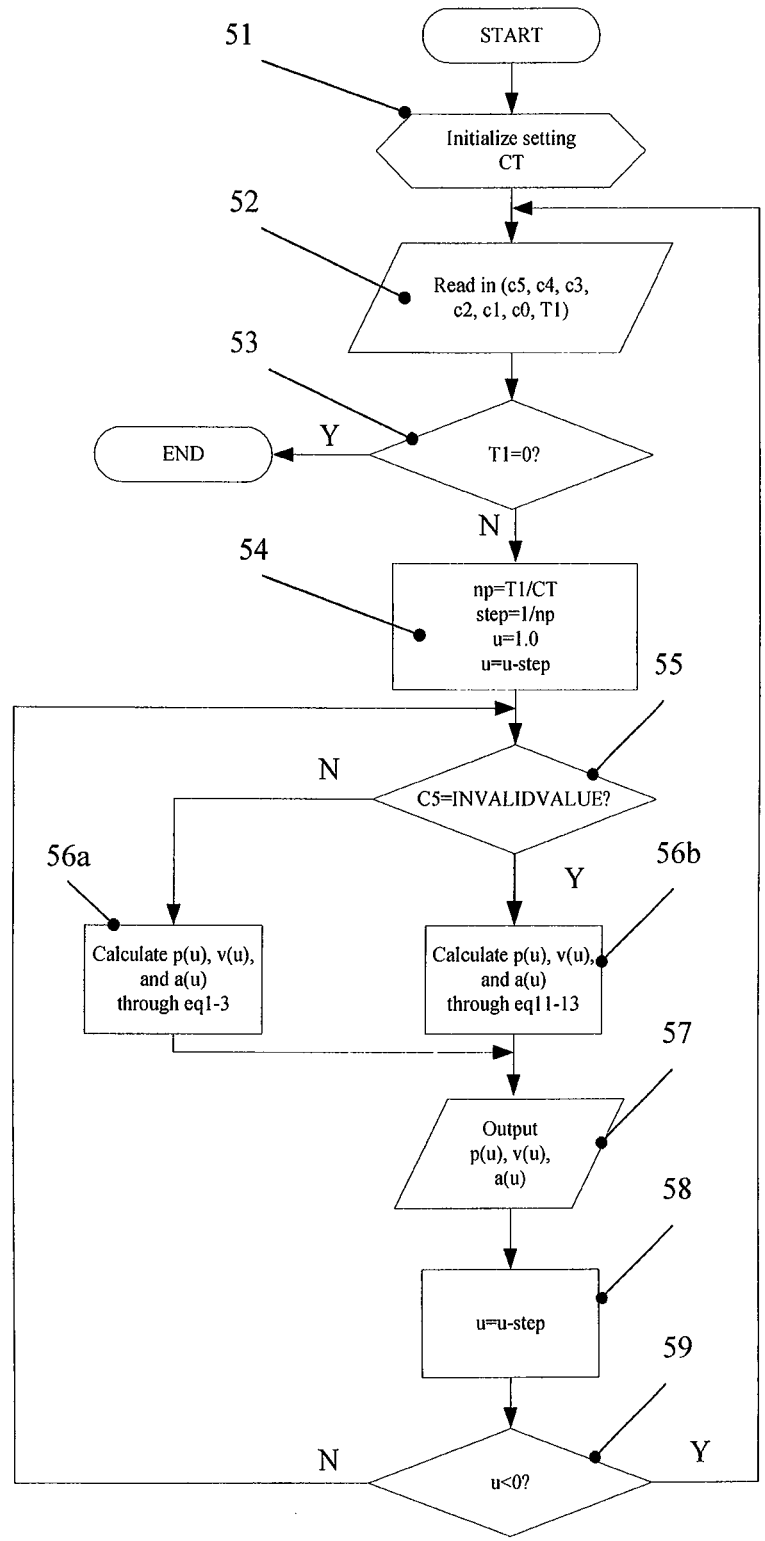
FIG. 5 a flow chart of joint trajectory servo cycle interpolation.

FIG. 4 is the flow chart of joint trajectory interpolation function, and FIG. 5 is the flow chart of joint trajectory servo cycle interpolation. Both of the figures describe an implement method for the Joint Trajectory Interpolator 15 referred in FIG. 2. The FIG. 4 provides parameters of interpolation function in each trajectory path points' interval for the FIG. 5. The FIG. 5 calculates the position, velocity and acceleration of interpolation function and provides motion command to motion servo controller in each servo period CT.

In FIG. 4, Joint Trajectory Interpolator 15 commands Module 41 to initialize public data areas A and B. The public data area A is used to store the data of joint trajectory path points, and the public data area B is used to store the parameters of piecewise interpolation function. Moreover, invalid number of velocity and acceleration is set, which can be described by a large enough number beyond the reasonable motion range, such as 100000000 or −100000000. Module 42 is used to read in two path points [(p1,v1,a1,T1), (p2,v2,a2,T2)] from public data area A to constitute a data set. The data representation of (pi,vi,ai,Ti) is in accordance with $(q_j, \dot{q}_j, \ddot{q}_j, T_i)_i$.

According to the characteristic of the second path point (p2,v2,a2,T2), there are four different situations:

Case 1: if the acceleration of the second path point a2 is valid (Module 81), Module 43 is invoked, and a quintic polynomial is used to describe position, see eq. 1; then a quartic polynomial is used to describe velocity, see eq. 2; and a cubic polynomial is used to describe acceleration, see eq. 3. 'u' in each formula is a normalized time variable, whose definition is in eq. 10. Eq. 2 is the derivative of eq. 1 with respect to 'u', and eq. 3 is the derivative of eq. 2 with respect to 'u'. The parameters (c5,c4,c3,c2,c1,c0) in eq. 1-3 can be calculated by eq. 4-9, respectively. Velocity and acceleration verification Module 85 is used to calculate the maximum velocity $v_{max}$ and acceleration $a_{max}$ within [0,1] through eq. 2 and eq. 3, comparing $v_{max}$ and $a_{max}$ with the velocity's limit value and acceleration's limit value in Robot Parameter Database 13, respectively. If $v_{max}$ exceeds velocity's limit value or $a_{max}$ exceeds acceleration's limit value, the interpolation is finished, and error message is returned to Motion Command Interface 10. If there is no error, Module 90 is used to write the calculation result (c5,c4,c3,c2,c1,c0) and T1 into public data area B as an integrated unit. Then Module 94 is used to reconstruct data set [(p1,v1,a1,T1)], let (p1,v1,a1,T1)=(p2,v2,a2,T2). If the time T2 of the second path point in data set is equal to 0, then procedure is ended for selecting piecewise interpolation function. Otherwise, Module 42 is used to read in the next path point from public data area A, and begin a new procedure of calculation.

$$p(u)=c5 \cdot u^5+c4 \cdot u^4+c3 \cdot u^3+c2 \cdot u^2+c1 \cdot u+c0 \quad (eq.\ 1)$$

$$v(u)=-(c1+2 \cdot c2 \cdot u+3 \cdot c3 \cdot u^2+4 \cdot a4 \cdot u^3+5 \cdot c5 \cdot u^4)/T1 \quad (eq.\ 2)$$

$$a(u)=(2 \cdot c2+6 \cdot c3 \cdot u+12 \cdot c4 \cdot u2+20 \cdot c5 \cdot u3)/T1^2 \quad (eq.\ 3)$$

$$c5=(12 \cdot p1-12 \cdot p2+6 \cdot T1 \cdot v1+6 \cdot T1 \cdot v2+T1^2 \cdot a1-T1^2 \cdot a2)/2 \quad (eq.\ 4)$$

$$c4=(-30 \cdot p1+30 \cdot p2-14 \cdot T1 \cdot v1-16 \cdot T1 \cdot v2-2 \cdot T1^2 \cdot a1+3 \cdot T1^2 \cdot a2)/2 \quad (eq.\ 5)$$

$$c3=(20 \cdot p1-20 \cdot p2+8 \cdot T1 \cdot v1+12 \cdot T1 \cdot v2+T1^2 \cdot a1-3 \cdot T1^2 \cdot a2)/2 \quad (eq.\ 6)$$

$$c2=(T1^2 \cdot a2)/2 \quad (eq.\ 7)$$

$$c1=-(T1 \cdot v2) \quad (eq.\ 8)$$

$$c0=p2 \quad (eq.\ 9)$$

$$u=1-(t-t1)/T1 \quad (eq.\ 10)$$

Case 2: if the acceleration of the second path point a2 is invalid, while the velocity v2 is valid (Module 82), Module 44 is invoked, and a quartic polynomial is used to describe position, see eq. 11; then a cubic polynomial is used to describe velocity, see eq. 12; and a quadratic polynomial is used to describe acceleration, see eq. 13. 'u' in each formula is a normalized time variable, whose definition is in eq. 10. Eq. 12 is the derivative of eq. 11 with respect to 'u', and eq. 13 is the derivative of eq. 12 with respect to 'u'. The parameters (c4, c3, c2, c1, c0) in eq. 11-13 can be calculated by eq. 14-18, respectively. a2 can be calculated by eq. 19 to substitute for the invalid number in (p2,v2,a2,T2). Velocity and acceleration verification Module 86 is used to calculate the maximum velocity $v_{max}$ and acceleration $a_{max}$ within [0,1] through eq. 12 and eq. 13, comparing $v_{max}$ and $a_{max}$ with the velocity's limit value and acceleration's limit value in Robot Parameter Database 13, respectively. If $v_{max}$ exceeds velocity's limit value or $a_{max}$ exceeds acceleration's limit value, the interpolation is finished, and error message is returned to Motion Command Interface 10. If there is no error, Module 91 is used to write the calculation result (c5=INVALIDVALUE, c4,c3,c2,c1,c0) and T1 into public data area B as an integrated unit. Module 95 is used to reconstruct data set [(p1,v1,a1,T1)], wherein (p1,v1,a1,T1)=(p2,v2,a2,T2). Then Module 42 is used to read in the next path point from public data area A, and begin a new procedure of calculation.

$$p(u)=c4 \cdot u^4+c3 \cdot u^3+c2 \cdot u^2+c1 \cdot u+c0 \quad (eq.\ 11)$$

$$v(u)=-(c1+2 \cdot c2 \cdot u+3 \cdot c3 \cdot u^2+4 \cdot a4 \cdot u^3)/T1 \quad (eq.\ 12)$$

$$a(u)=(2 \cdot c2+6 \cdot c3 \cdot u+12 \cdot c4 \cdot u2)/T1^2 \quad (eq.\ 13)$$

$$c4=(6 \cdot p1-6 \cdot p2+4 \cdot T1 \cdot v1+2 \cdot T1 \cdot v2+T1^2 \cdot a1)/2 \quad (eq.\ 14)$$

$$c3=-8 \cdot p1+8 \cdot p2-5 \cdot T1 \cdot v1-3 \cdot T1 \cdot v2-T1^2 \cdot a1 \quad (eq.\ 15)$$

$$c2=(12 \cdot p1-12 \cdot p2+6 \cdot T1 \cdot v1+6 \cdot T1 \cdot v2+T1^2 \cdot a1)/2 \quad (eq.\ 16)$$

$$c1=-(T1 \cdot v2) \quad (eq.\ 17)$$

$$c0=p2 \quad (eq.\ 18)$$

$$a2=-(-12 \cdot p1+12 \cdot p2-6 \cdot T1 \cdot v1-6 \cdot T1 \cdot v2-T1^2 \cdot a1)/T1^2 \quad (eq.\ 19)$$

Case 3: if the velocity of the second path point v2 is invalid (Module 83), then data of third path point is read in to form data set [(p1,v1,a1,T1), (p2,v2,a2,T2), (p3,v3,a3,T3)], while v3 is valid. Module 45 is invoked, and a quartic polynomial is used to describe the position of trajectory curve connecting the first path point and the second path point, such as eq. 11; then a cubic polynomial is used to describe the velocity of trajectory curve connecting the first path point and the second path point, such as eq. 12; and a quadratic polynomial is used to describe the acceleration of trajectory curve connecting the first path point and the second path point, such as eq. 13. 'u' in each formula is a normalized time variable, whose definition is in eq. 10. Eq. 12 is the derivative of eq. 11 with respect to 'u' and eq. 13 is the derivative of eq. 12 with respect to 'u'. The parameters (c4, c3, c2, c1, c0) in eq. 11-13 can be calculated by eq. 20-24, respectively. v2 can be calculated by eq. 25 and a2 can be calculated by eq. 26 to substitute for the invalid number in (p2,v2,a2,T2). Velocity and acceleration verification Module 87 is used to calculate the maximum velocity $v_{max}$ and acceleration $a_{max}$ within [0,1] through eq. 12 and eq. 13, comparing $v_{max}$ and $a_{max}$ with the velocity's limit value and acceleration's limit value in Robot Parameter Database 13, respectively. If $v_{max}$ exceeds velocity's limit value or $a_{max}$ exceeds acceleration's limit value, the interpolation is finished, and error message is returned to Motion Command Interface 10. If there is no error, Module 92 is used to write the calculation result (c5=INVALIDVALUE,c4,c3,c2,c1,c0) and T1 into public data area B as an integrated unit. Module 96 is used to reconstruct data set [(p1,v1,a1,T1),(p2,v2,a2,T2)], wherein (p1,v1,a1,T1)=(p2,v2,a2,T2), and (p2,v2,a2,T2)= (p3, v3,a3,T2). Then the second path point in previous data set becomes the first path point in current data set, and the third path point in previous data set becomes the second path point in current data set. Module 81 is used to begin a new procedure of calculation.

$$c4=-(-6 \cdot T1 \cdot T2 \cdot p1-3 \cdot T2^2 \cdot p1+3 \cdot T1^2 \cdot p2+6 \cdot T1 \cdot T2 \cdot p2+3 \cdot T2^2 \cdot p2-3 \cdot T1^2 \cdot p3-4 \cdot T1^2 \cdot T2 \cdot v1-3 \cdot T1 \cdot T2^2 \cdot v1+T1^2 \cdot T2 \cdot v3-T1^3 \cdot T2 \cdot a1-T1^2 \cdot T2^2 \cdot a1)/(T2 \cdot (2 \cdot T1+3 \cdot T2)) \quad (eq.\ 20)$$

$$c3=-(32 \cdot T1 \cdot T2 \cdot p1+13 \cdot T2^2 \cdot p1-32 \cdot T1 \cdot T2 \cdot p2-12 \cdot T2^2 \cdot p2+18T1^2 \cdot p3+20 \cdot T1^2 \cdot T2 \cdot v1+12 \cdot T1 \cdot T2^2 \cdot v1-6 \cdot T1^2 \cdot T2 \cdot v3+4 \cdot T1^3 \cdot T2 \cdot a1+3T1^2 \cdot T2^2 \cdot a1)/2 \cdot T2 \cdot (2 \cdot T1+3 \cdot T2)) \quad (eq.\ 21)$$

$$c2=-(-12 \cdot T2^2 \cdot p1-6 \cdot T1^2 \cdot p3-6 \cdot T1 \cdot T2^2 \cdot v1-2 \cdot T1^2 \cdot T2 \cdot v3-T1^2 \cdot T2^2 \cdot a1)/(2 \cdot T2 \cdot (2 \cdot T1+3 \cdot T2)) \quad (eq.\ 22)$$

$$c1=2 \cdot (12 \cdot T2 \cdot p1-9 \cdot T1 \cdot p2+9 \cdot p3+6T1 \cdot T2 \cdot v1-3 \cdot T1 \cdot T2 \cdot v3+T1^2 \cdot T2 \cdot a1)/(T1 \cdot T2 \cdot (2 \cdot T1+3 \cdot T2)) \quad (eq.\ 23)$$

$$c0 = p2 \quad \text{(eq. 24)}$$

$$v2 = -(12 \cdot T2^2 \cdot p1 + 6 \cdot T1^2 \cdot p3 + 6 \cdot T1 \cdot T2^2 \cdot v1 + 2 \cdot T1^2 \cdot T2 \cdot v3 + T1^2 \cdot T2^2 \cdot a1)/(2 \cdot T1 \cdot T2 \cdot (2 \cdot T1 + 3 \cdot T2)) \quad \text{(eq. 25)}$$

$$a2 = -(-12 \cdot T1 \cdot T2 \cdot p1 + 9 \cdot T1^2 \cdot p2 + 9 \cdot T1^2 \cdot p3 - 6 \cdot T1^2 \cdot T2 \cdot v1 + 3 \cdot T1^2 \cdot T2 \cdot v3 - T1^3 \cdot T2 \cdot a1)/(T2 \cdot (2 \cdot T1 + T2)) \quad \text{(eq. 26)}$$

Case 4: if the velocity of the second path point v2 is invalid (Module 83), then the third path point is read in to form data set [(p1,v1,a1,T1), (p2,v2,a2,T2), (p3,v3,a3,T3)], while v3 is invalid too. Module 46 is invoked, and a quartic polynomial is used to describe the position of trajectory curve connecting the first path point and the second path point, such as eq. 11; then a cubic polynomial is used to describe the velocity of trajectory curve connecting the first path point and the second path point, such as eq. 12, and a quadratic polynomial is used to describe the acceleration of trajectory curve connecting the first path point and the second path point, such as eq. 13. 'u' in each formula is a normalized time variable, whose definition is in eq. 10. Eq. 12 is the derivative of eq. 11 with respect to 'u', and eq. 13 is the derivative of eq. 12 with respect to 'u'. The parameters (c4, c3, c2, c1, c0) in eq. 11-13 can be calculated by eq. 27-31, respectively. v2 can be calculated by eq. 32 and a2 can be calculated by eq. 33 to substitute for the invalid number in (p2,v2,a2,T2). Velocity and acceleration verification Module 88 is used to calculate the maximum velocity $v_{max}$ and acceleration $a_{max}$ within [0,1] through eq. 12 and eq. 13, comparing $v_{max}$ and $a_{max}$ with the velocity's limit value and acceleration's limit value in Robot Parameter Database 13, respectively. If $v_{max}$ exceeds velocity's limit value or $a_{max}$ exceeds acceleration's limit value, the interpolation is finished, and error message is returned to Motion Command Interface 10. If there is no error, Module 93 is used to write the calculation result (c5=INVALIDVALUE,c4,c3,c2,c1,c0) and T1 into public data area B as an integrated unit. Module 97 is used to reconstruct data set [(p1,v1,a1,T1), (p2,v2,a2,T2)], wherein (p1,v1,a1,T1)=(p2,v2,a2,T2), and (p2,v2,a2,T2)=(p3,v3,a3,T2). Module 81 is used to begin a new procedure of calculation.

$$c4 = -(-6 \cdot T1 \cdot T2 \cdot p1 - 6 \cdot T2^2 \cdot p1 + 6 \cdot T1 \cdot T2 \cdot p2 + 6 \cdot T2^2 \cdot p2 - 2 \cdot T1^2 \cdot p3 - 4 \cdot T1^2 \cdot T2 \cdot v1 - 6 \cdot T1 \cdot T2^2 \cdot v1 - T1^3 \cdot T2 \cdot a1 - 2 \cdot T1^2 \cdot T2^2 \cdot a1)/(2 \cdot T2 \cdot (T1 + 3 \cdot T2)) \quad \text{(eq. 27)}$$

$$c3 = -(16 \cdot T1 \cdot T2 \cdot p1 + 13 \cdot T2^2 \cdot p2 - 6 \cdot T1^2 \cdot p2 - 16 \cdot T1 \cdot T2 \cdot p2 - 12 \cdot T2^2 \cdot p2 + 6 \cdot T1^2 \cdot p3 + 10 \cdot T1^2 \cdot T2 \cdot v1 + 12 \cdot T1 \cdot T2^2 \cdot v1 + 2 \cdot T1^3 \cdot T2 \cdot a1 + 3 \cdot T1^2 \cdot T2^2 \cdot a1)/(2 \cdot T2 \cdot (T1 + 3 \cdot T2)) \quad \text{(eq. 28)}$$

$$c2 = (T1 \cdot (12 \cdot T2 \cdot p2 + 6 \cdot T1 \cdot T2 \cdot v1 + T1^2 \cdot T2 \cdot a1)/(2 \cdot T2 \cdot (T1 + 3 \cdot T2)) \quad \text{(eq. 29)}$$

$$c1 = -(-12 \cdot T2^2 \cdot p1 - 2 \cdot T1^2 \cdot p2 + 2 \cdot T1^2 \cdot p3 - 6 \cdot T1 \cdot T2^2 \cdot v1 - T1^2 \cdot T2^2 \cdot a1)/(2 \cdot T2 \cdot (T1 + 3 \cdot T2)) \quad \text{(eq. 30)}$$

$$c0 = p2 \quad \text{(eq. 31)}$$

$$v2 = -(-12 \cdot T2^2 \cdot p1 + 2 \cdot T1^2 \cdot p2 + -2 \cdot T1^2 \cdot p3 + 6 \cdot T1 \cdot T2^2 \cdot v1 + T1^2 \cdot T2^2 \cdot a1)/(2 \cdot T1 \cdot T2 \cdot (T1 + 3 \cdot T2)) \quad \text{(eq. 32)}$$

$$a2 = -(-12 \cdot T2 \cdot p1 + 6 \cdot T1 \cdot p2 - 6 \cdot T1 p3 - 6 \cdot T1 \cdot T2 \cdot v1 - T1^2 \cdot T2 \cdot a1)/(T1 \cdot T2 \cdot (T1 + 3 \cdot T2)) \quad \text{(eq. 33)}$$

In FIG. 5, Joint Trajectory Interpolator 15 commands Module 51 to initialize servo cycle CT. Module 52 is used to read in a set of data C5,C4,C3,C2,C1,C0,T1 Module 53 is used to determine whether the current data is the last one according to T1 is equal to 0 or not. If T1 is equal to 0, the process is ended, and if T1 is not equal to 0, the initial step length step and u are set. Module 55 is used to determine whether C5 is valid or not.

If C5 is valid, Module 56b calculates [p(u),v(u),a(u)] through eq. 11-13; If C5 is invalid, Module 56a calculates [p(u),v(u),a(u)] through eq. 1-3. Module 57 sends calculation results to robot servo controller. Then Module 58 calculates u in the next cycle. Module 59 determines whether u is less than 0. If u is less than 0, Module 52 reads in parameters of new interpolation function; otherwise, Module 55 calculates interpolation through the current interpolation function. The data is provided to motion servo program of numerical control system. Before servo cycle, motion servo program reads in the parameters of the current trajectory polynomial, calculates the position, velocity and acceleration of motion trajectory in current servo cycle, and provides the parameters of the position, velocity and acceleration to robot servo controller as input command.

The invention claimed is:

1. A method for robot trajectory generation with continuous acceleration, comprising the steps of:
   receiving a user's motion command through a motion command interface, and sending the user's motion command to a Cartesian trajectory generator;
   converting the user's command to a plurality of trajectory path points of robot end effector in Cartesian space;
   transforming the plurality of trajectory path points of robot end effector in Cartesian space into a plurality of robot trajectory path points in a joint space, at least one of the plurality of trajectory path points forming a singluar configuration and at least one of the plurality of trajectory path points forming a non-singular configuration;
   calculating positions, velocities and accelerations of robot joints in each of a plurality of motion servo cycle, wherein a motion servo cycle is an interval of time;
   comparing the velocities and accelerations of the robot joints generated by a joint Trajectory Interpolator with a velocity's limit value and an acceleration's limit value of each robot joint stored in a robot parameter database respectively; and
   when a comparison result is in a range between a maximum velocity and a minimum velocity in a motion servo cycle, sending a joint motion command to a motion servo interface.

2. The method according to claim 1 wherein when a singular configuration is formed, a velocity of a robot joint is set as an invalid number, and when a non-singluar configuration is formed, the velocity of the robot joints are calculated by the following formula:

$$\begin{bmatrix} \dot{q}_1 \\ \dot{q}_2 \\ \vdots \\ \dot{q}_j \\ \vdots \\ \dot{q}_N \end{bmatrix}_i = J_i^{-1} \begin{bmatrix} \omega x \\ \omega y \\ \omega z \\ vx \\ vy \\ vz \end{bmatrix}_i,$$

where $J_i^{-1}$ represents an inverse Jacobian matrix at an $i^{th}$ path point on robot trajectory, $[\dot{q}_1, \dot{q}_2, \ldots \dot{q}_j, \ldots, \dot{q}_N]_i^T$ represents a velocity vector in Joint space at the $i^{th}$ path point on robot trajectory, $[\omega x, \omega y, \omega z, vx, vy, vz]_i^T$ represents a velocity vector in Cartesian space at the $i^{th}$ path point on robot trajectory.

3. The method according to claim 1, wherein when a singluar configuration is formed, acceleration of robot joints is set as an invalid number, and when only nonsingular configurations are formed, the acceleration of robot joints are calculated by the following formula:

$$\left(\begin{bmatrix}\xi x\\\xi y\\\xi z\\ax\\ay\\az\end{bmatrix}_j\right)_i = \left(\left(\begin{bmatrix}\xi x\\\xi y\\\xi z\\ax\\ay\\az\end{bmatrix}_{j-1}\right) + S_j\cdot\ddot{q}_j + \dot{S}_j\cdot\dot{q}_j\right)_i$$

where i represents the path point's index on a trajectory; $S_j$ and $\dot{S}_j$ represent a joint axis vector and its derivative at a $j^{th}$ joint respectively; $\dot{q}_j$ and $\ddot{q}_j$ describe velocity and acceleration at the $j^{th}$ joint in Joint space respectively; $[\xi x,\xi y,\xi z,ax,ay,az]_j^T$ represents an acceleration vector at the $j^{th}$ joint in Cartesian space, $[\xi x,\xi y,\xi z,ax,ay,az]_{j-1}^T$ represents an acceleration vector at the $(j-1)^{th}$ joint in Cartesian space.

4. The method according to claim 1, wherein time intervals between path points are calculated by the following formula:

$$T_i = 2\sqrt{\frac{(lx_{i+1}-lx_i)^2+(ly_{i+1}-ly_i)^2+(lz_{i+1}-lz_i)^2}{(vx_i+vx_{i+1})^2+(vy_i+vy_{i+1})^2+(vz_i+vz_{i+1})^2}}$$

where $T_i$ represents a time between an $i^{th}$ path point and an $(i+1)^{th}$ path point; $(lx_i,ly_i,lz_i)$ and $(lx_{i+1},ly_{i+1},lz_{i+1})$ represent a position of a robot tool center point (TCP) between the $i^{th}$ path point and the $(i+1)^{th}$ path point on robot trajectory respectively; $(vx_i,vy_i,vz_i)$ and $(vx_{i+1},vy_{i+1},vz_{i+1})$ represent a velocity of the robot TCP between the $i^{th}$ path point and the $(i+1)^{th}$ path point on robot trajectory respectively.

5. The method according to claim 1, wherein the calculation of positions, velocities and accelerations of robot joints comprises:
   if the acceleration at a second path point is not set as an invalid number,
   a quintic polynomial is used to describe the positions;
   a quartic polynomial is used to describe the velocities; and
   a cubic polynomial is used to describe the accelerations.

6. The method according to claim 1, wherein the calculation of positions, velocities and accelerations of robot joints comprise:
   if the acceleration at a second path point is set as an invalid number while the velocity is not set as an invalid number,
   a quartic polynomial is used to describe positions;
   a cubic polynomial is used to describe velocities;
   a quadratic polynomial is used to describe accelerations, and the acceleration of the second path point is calculated by the quadratic polynomial to substitute for the invalid value.

7. The method according to claim 1, wherein the calculation of positions, velocities and accelerations of robot joints comprise:
   if the velocity of a second path point is set as an invalid number, a third path point is read in to form a data set [(p1, v1, a1, T1), (p2, v2, a2, T2), (p3, v3, a3, T3)], while the velocity of the third path point is not set as an invalid number,
   a quartic polynomial is used to describe the position of trajectory curve connecting a first path point and the second path point;
   a cubic polynomial is used to describe the velocity of trajectory curve connecting the first path point and the second path point;
   a quadratic polynomial is used to describe the acceleration of trajectory curve connecting the first path point and the second path point,
   where,
   p1 is a position of the first path point,
   p2 is a position of the second path point,
   p3 is a position of the third path point,
   v1 is a velocity of the first path point,
   v2 is a velocity of the second path point,
   v3 is a velocity of the third path point,
   a1 is an acceleration of the first path point,
   a2 is an acceleration of the second path point,
   a3 is an acceleration of the third path point,
   T1 is a time interval between the first path point and the second path point
   T2 is a time interval between the second path point and the third path point, and
   T3 is a time interval between the third path point and a fourth path point.

8. The method according to claim 1, wherein the calculation of positions, velocities and accelerations of robot joints comprise:
   if the velocity of a second path point is set as an invalid value, then a third path point is read in to form a data set [(p1,v1,a1,T1), (p2,v2,a2,T2), (p3,v3,a3,T3)], and if the velocity of the third path point is set as an invalid value,
   a quartic polynomial is used to describe the position of trajectory curve connecting a first path point and the second path point;
   a cubic polynomial is used to describe the velocity of trajectory curve connecting the first path point and the second path point, and the velocity of the second path point is calculated by the polynomial to substitute for the invalid value;
   a quadratic polynomial is used to describe the acceleration of trajectory curve connecting the first path point and the second path point, the acceleration of the second path point can be calculated by the polynomial to substitute for the invalid value,
   where,
   p1 is a position of the first path point,
   p2 is a position of the second path point,
   p3 is a position of the third path point,
   v1 is a velocity of the first path point,
   v2 is a velocity of the second path point,
   v3 is a velocity of the third path point,
   a1 is an acceleration of the first path point,
   a2 is an acceleration of the second path point,
   a3 is an acceleration of the third path point,
   T1 is a time interval between the first path point and the second path point
   T2 is a time interval between the second path point and the third path point, and
   T3 is a time interval between the third path point and a fourth path point.

9. The method according to claim 5, wherein said quintic polynomial is:

$$p(u)=c5\cdot u^5+c4\cdot u^4+c3\cdot u^3+c2\cdot u^2+c1\cdot u+c0$$

where 'u' is a normalized variable respect to time 't'.

10. The method according to claim 5, wherein said quartic polynomial is:

$$v(u)=-(c1+2\cdot c2\cdot u+3\cdot c3\cdot u^2+4\cdot c4\cdot u^3+5\cdot c5\cdot u^4)/T1$$

where 'u' is a normalized variable respect to time 't', and T1 is a time interval between a first path point and a second path point.

11. The method according to claim 5, wherein said cubic polynomial is:

$$a(u)=(2 \cdot c2+6 \cdot c3 \cdot u+12 \cdot c4 \cdot u2+20 \cdot c5 \cdot u3)/T1^2$$

where 'u' is a normalized variable respect to time 't', and T1 is a time interval between a first path point and a second path point.

12. The method according to claim 6, wherein said quartic polynomial is:

$$p(u)=c4 \cdot u^4+c3 \cdot u^3+c2 \cdot u^2+c1 \cdot u+c0$$

where 'u' is a normalized variable respect to time 't'.

13. The method according to claim 6, wherein said cubic polynomial is:

$$v(u)=-(c1+2 \cdot c2 \cdot u+3 \cdot c3 \cdot u^2+4 \cdot c4 \cdot u^3)/T1$$

where 'u' is a normalized variable respect to time 't', and T1 is a time interval between a first path point and a second path point.

14. The method according to claim 6, wherein said quadratic polynomial is:

$$a(u)=(2 \cdot c2+6 \cdot c3 \cdot u+12 \cdot c4 \cdot u2)/T1^2$$

where 'u' is a normalized variable respect to time 't', and T1 is a time interval between a first path point and a second path point.

15. The method according to claim 7, wherein the quartic polynomial is:

$$p(u)=c4 \cdot u^4+c3 \cdot u^3+c2 \cdot u^2+c1 \cdot u+c0$$

where 'u' is a normalized variable respect to time 't'.

16. The method according to claim 7, wherein the cubic polynomial is:

$$v(u)=-(c1+2 \cdot c2 \cdot u+3 \cdot c3 \cdot u^2+4 \cdot c4 \cdot u^3)/T1$$

where 'u' is a normalized variable respect to time 't'.

17. The method according to claim 7, wherein the quadratic polynomial is:

$$a(u)=(2 \cdot c2+6 \cdot c3 \cdot u+12 \cdot c4 \cdot u2)/T1^2$$

where 'u' is a normalized variable respect to time 't'.

18. The method according to claim 8, wherein the quartic polynomial is:

$$p(u)=c4 \cdot u^4+c3 \cdot u^3+c2 \cdot u^2+c1 \cdot u+c0$$

where 'u' is a normalized variable respect to time 't'.

19. The method according to claim 8, wherein the cubic polynomial is:

$$v(u)=-(c1+2 \cdot c2 \cdot u+3 \cdot c3 \cdot u^2+4 \cdot c4 \cdot u^3)/T1$$

where 'u' is a normalized variable respect to time 't'.

20. The method according to claim 8, wherein the quadratic polynomial is:

$$a(u)=(2 \cdot c2+6 \cdot c3 \cdot u+12 \cdot c4 \cdot u2)/T1^2$$

where 'u' is a normalized variable respect to time 't'.

21. A system for robot trajectory generation with continuous acceleration, comprising:
   one or more memories; and
   one or more processing devices configured to implement:
   a trajectory coordinator configured to receive a user's motion command through a motion command interface;
   a Cartesian trajectory generator configured to receive the user's motion command from the trajectory coordinator and to convert the user's motion command to a plurality of trajectory path points of a robot end effector in Cartesian space;
   a joint trajectory converter configured to transform the plurality of trajectory path points of the robot end effector in Cartesian space into a plurality of robot trajectory path points in joint space, at least one of the plurality of trajectory of trajectory path points forming a singular configuration and at least one of the plurality of trajectory path points forming a non-singular configuration;
   a joint trajectory interpolator configured to calculate the positions, velocities and accelerations of robot joints in each motion servo cycle, and to set velocity of a trajectory path point to an invalid value when the trajectory path point forms a singular configuration;
   wherein the trajectory coordinator is configured to compare the velocities and accelerations of robot joints generated by the joint trajectory interpolator with one or more threshold values stored in a robot parameter database, and to selectively send joint motion commands to a motion servo interface based on the comparison.

22. The system according to claim 21, wherein
   if the comparison result is in a range between a maximum velocity and a minimum velocity, a joint motion command in each motion servo cycle generated by the joint trajectory interpolator is sent to the motion servo interface.

* * * * *